(12) United States Patent
Belleville et al.

(10) Patent No.: US 12,163,417 B1
(45) Date of Patent: Dec. 10, 2024

(54) INTEGRATED DRILLING SYSTEM

(71) Applicant: Schlumberger Technology Corporation, Sugar Land, TX (US)

(72) Inventors: Rachel Belleville, Houston, TX (US); Dean M. Homan, Damon, TX (US); Mark Frey, Sugar Land, TX (US); Michael Hui Du, Manvel, TX (US); Patrick Fisseler, Sugar Land, TX (US)

(73) Assignee: SCHLUMBERGER TEHCNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/697,618

(22) PCT Filed: Jan. 11, 2023

(86) PCT No.: PCT/US2023/060497
§ 371 (c)(1),
(2) Date: Apr. 1, 2024

(87) PCT Pub. No.: WO2023/137338
PCT Pub. Date: Jul. 20, 2023

Related U.S. Application Data

(60) Provisional application No. 63/298,650, filed on Jan. 12, 2022.

(51) Int. Cl.
*E21B 47/013* (2012.01)
*E21B 7/04* (2006.01)
*E21B 17/02* (2006.01)
*E21B 44/00* (2006.01)
*E21B 47/024* (2006.01)

(52) U.S. Cl.
CPC ............. *E21B 47/013* (2020.05); *E21B 7/04* (2013.01); *E21B 17/028* (2013.01); *E21B 44/00* (2013.01); *E21B 47/024* (2013.01)

(58) Field of Classification Search
CPC ........ E21B 47/013; E21B 7/04; E21B 17/028; E21B 44/00; E21B 47/024
See application file for complete search history.

(56) References Cited

U.S. PATENT DOCUMENTS

| | | |
|---|---|---|
| 4,949,045 A | 8/1990 | Clark |
| 5,631,563 A | 5/1997 | Moriarty |
| 7,093,672 B2 | 8/2006 | Seydoux |

(Continued)

*Primary Examiner* — Dany E Akakpo
(74) *Attorney, Agent, or Firm* — Jeffrey D. Frantz

(57) ABSTRACT

An integrated drilling system includes a rotary steerable control unit and an electromagnetic LWD control unit deployed in an external collar. The rotary steerable control unit is deployed below the electromagnetic LWD control unit and is configured to control a direction of drilling of the integrated drilling system. A near bit electromagnetic antenna is deployed in a recess on the collar circumferentially about the rotary steerable control unit. At least one electromagnetic transmitter and at least one electromagnetic receiver are deployed in corresponding recesses in the collar circumferentially about the electromagnetic LWD control unit with the at least one transmitter and at least one receiver configured to make electromagnetic logging measurements while drilling. An electrical jumper provides an electrical connection between the near bit electromagnetic antenna and the electromagnetic LWD control unit.

17 Claims, 4 Drawing Sheets

(56) References Cited

U.S. PATENT DOCUMENTS

| | | |
|---|---|---|
| 8,736,276 B2 | 5/2014 | Stonehouse |
| 9,134,448 B2 | 9/2015 | Seydoux et al. |
| 9,273,517 B2 | 3/2016 | Tchakarov |
| 10,914,120 B2 | 2/2021 | Menger |
| 2011/0006773 A1* | 1/2011 | Bittar ............... E21B 47/0228 324/333 |
| 2011/0234230 A1 | 9/2011 | Bittar |
| 2012/0145458 A1* | 6/2012 | Downton ............ E04D 13/165 175/231 |
| 2015/0285070 A1 | 10/2015 | Bittar |
| 2018/0195382 A1 | 7/2018 | Chen |
| 2020/0182037 A1 | 6/2020 | Tchakarov |
| 2021/0254454 A1 | 8/2021 | Pan |

* cited by examiner

INTEGRATED DRILLING SYSTEM

CROSS REFERENCE TO RELATED APPLICATIONS

The present application is the National Stage Entry of International Application No. PCT/US2023/060497, filed Jan. 11, 2023, which claims the benefit of and priority to U.S. Provisional Patent Application No. 63/298,650, filed on Jan. 12, 2022. The contents of the aforementioned application are incorporated herein by reference in their entirety.

BACKGROUND INFORMATION

Electromagnetic logging measurements are commonly made in oilfield operations. Such measurements may provide formation resistivity and dielectric properties as well as information about remote geological features not intercepted by the measurement tool (e.g., remote beds, bed boundaries, and/or fluid contacts). This information may be used to evaluate the potential hydrocarbon bearing capacity of the formation as well as to provide information for steering the direction of drilling (e.g., in a geosteering or payzone steering operation).

Numerous tools and methods are known in the art for making electromagnetic logging while drilling (LWD) measurements. One difficulty in using such measurements (both conventional and directional resistivity measurements) in geosteering operations is the deployment of one or more electromagnetic antennas in close proximity to the drill bit. In order to minimize latency (and provide timely feedback for geosteering) it is desirable to make the LWD measurements as close to the bit as possible. Those of ordinary skill in the art will readily appreciate that reducing the distance between the electromagnetic antennas and the bit reduces the time between drilling (cutting the formation) and measuring the freshly cut formation, thereby providing more timely feedback. It may also be desirable to make electromagnetic look-ahead measurements that may be sensitive to formation properties ahead of the bit.

However, deployment of an electromagnetic antenna at or near the drill bit is not straightforward, particularly in a bottom hole assembly (BHA) including a rotary steerable system. The lower portion of the BHA tends to be particularly crowded with essential drilling and steering tools, e.g., often including the drill bit, a rotary steerable system, and a near-bit stabilizer. While at bit and/or near bit deployment of certain sensors is known, such deployments can compromise the integrity of the lower BHA. Notwithstanding, there remains a need for methods and systems for electromagnetic look-ahead measurements and for obtaining information about the subterranean formation as soon as possible, for example, to support geosteering and automated drilling routines.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

An integrated drilling system is disclosed. The system includes a rotary steerable control unit and an electromagnetic logging while drilling (LWD) control unit deployed in an external collar with the rotary steerable control unit being deployed below the electromagnetic LWD control unit in the collar. The rotary steerable control unit is configured to control a direction of drilling of the integrated drilling system. A near bit electromagnetic antenna is deployed in a recess on the collar circumferentially about the rotary steerable control unit. At least one electromagnetic transmitter and at least one electromagnetic receiver are deployed in corresponding recesses in the collar circumferentially about the electromagnetic LWD control unit with the at least one transmitter and at least one receiver configured to make electromagnetic logging measurements while drilling. An electrical jumper provides an electrical connection between the near bit electromagnetic antenna and the electromagnetic LWD control unit.

The integrated drilling system may advantageously enable electromagnetic measurements to be made with improved look-ahead sensitivity while maintaining steering performance equivalent to commercially available systems (e.g., the PowerDrive® rotary steerable systems available from Schlumberger). The disclosed embodiments may therefore advantageously provide for improved geosteering and payzone steering operations.

Figure 1:
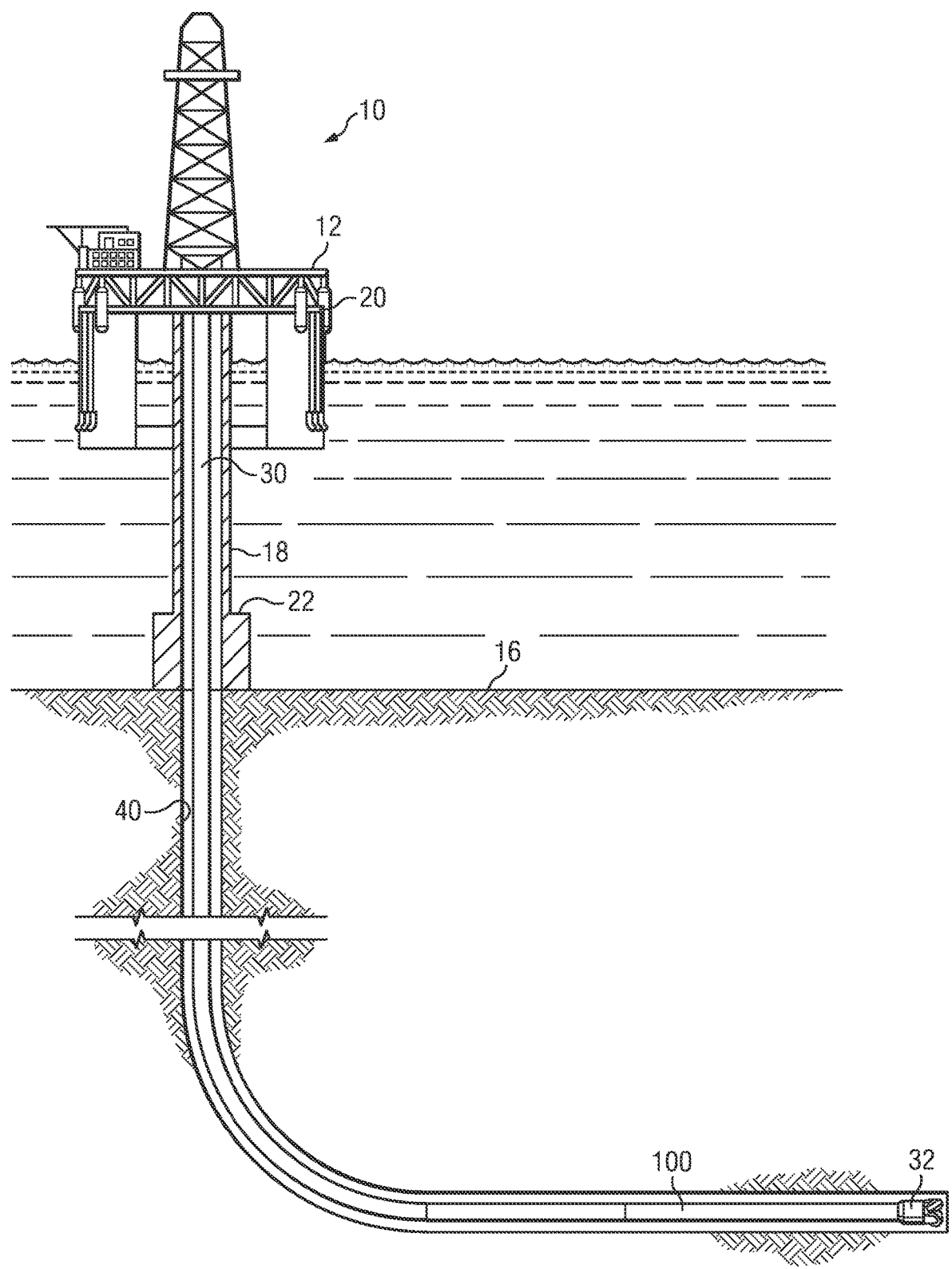
FIG. 1 depicts an example drilling rig for employing various integrated drilling systems disclosed herein.

FIG. 1 depicts an example drilling rig 10 suitable for employing various integrated drilling systems (including an integrated electromagnetic logging while drilling module and rotary steerable drilling system) disclosed herein. A semisubmersible drilling platform 12 is positioned over an oil or gas formation (not shown) disposed below the sea floor 16. A subsea conduit extends from deck of platform to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA). The BHA includes an integrated drilling system 100 (also referred to herein as system 100 or integrated system 100) configured to make downhole electromagnetic look-ahead measurements and optionally to steer the direction of drilling in response to those measurements.

It will be understood that the deployment illustrated on FIG. 1 is merely an example. Drill string 30 may include substantially any suitable downhole tool components, for example, including a downhole telemetry system, and one or more additional measurement while drilling (MWD) and/or logging while drilling (LWD) tools including various sensors for sensing downhole characteristics of the borehole and the surrounding formation. The disclosed embodiments are by no means limited to any particular drill string and/or BHA configuration. It will be further understood that the disclosed embodiments are not limited to use with a semi-submersible platform 12 as illustrated on FIG. 1. The disclosed embodiments are equally well suited for use with either onshore or offshore subterranean operations.

Those of ordinary skill in the art will readily appreciate that electromagnetic logging measurements are commonly made while drilling. Commercially available electromagnetic logging while drilling tools are well known, including, for example, the ECOSCOPE™, GeoSphere®, and PERISCOPE® logging tools available from Schlumberger.

Those of ordinary skill in the art will also readily appreciate that rotary steerable systems are commonly employed to steer the direction of drilling. Such tools are generally deployed in the BHA just above the drill bit. Commercially available rotary steerable systems are well known, including, for example, PowerDrive™ rotary steerable systems (available from Schlumberger) that fully rotate with the drill string (i.e., the outer housing rotates with the drill string). The PowerDrive Xceed™ makes use of an internal steering mechanism that does not require contact with the wellbore wall and enables the tool body to fully rotate with the drill string. The PowerDrive X5™, X6™, and Orbit® rotary steerable systems make use of mud actuated blades (or pads) that contact the wellbore wall. The extension of the blades (or pads) is rapidly and continually adjusted as the system rotates in the wellbore. The PowerDrive Archer® makes use of a lower steering section joined at a swivel with an upper section. The swivel is actively tilted via pistons so as to change the angle of the lower section with respect to the upper section and maintain a desired drilling direction as the bottom hole assembly rotates in the wellbore. Accelerometer and magnetometer sets may rotate with the drill string or may alternatively be deployed in an internal roll-stabilized housing (also referred to as a control unit) such that they remain substantially stationary (in a bias phase) or rotate slowly with respect to the wellbore (in a neutral phase). To drill a desired curvature, the bias phase and neutral phase are alternated during drilling at a predetermined ratio (referred to as the steering ratio).

Rotary steerable tools commonly include a controller (or control unit) deployed in a roll-stabilized housing or an otherwise substantially non-rotating housing deployed internal to the outer rotating housing or collar. By roll-stabilized it is meant that the sensor housing is substantially non-rotating with the respect to the wellbore (or rotates very slowly in comparison to the drill string). For example, various PowerDrive™ rotary steerable systems include a drill collar that is intended to fully rotate with the drill string (as described above) and an internal roll-stabilized control unit that is intended to remain substantially rotationally geostationary (i.e., rotationally stable with respect to the tool axis, the tool axis attitude being defined with respect to the wellbore reference frame).

In geosteering (or payzone steering) operations, the direction of drilling is changed or controlled in response to logging while drilling measurements. For example, the drilling direction may be controlled with the intent to maintain a distance between the wellbore and a measured formation boundary. Electromagnetic logging while drilling measurements are commonly utilized for such geosteering operations.

It will be appreciated that logging measurements that are sensitive to the properties and/or structure of the formation ahead of the bit may be particularly useful in geosteering operations. Such measurements may be thought of as "looking ahead" of the bit in that they may provide an indication of the characteristics of the formation ahead of or in front of the bit. The disclosed embodiments include a system configured for making electromagnetic look-ahead measurements while drilling.

In conventional BHA configurations, an electromagnetic logging module may be deployed above a rotary steerable system which is in turn deployed above the bit. In such configurations, owing in part to the length of the rotary steerable system control unit, the electromagnetic sensors (transmitter and receivers) are deployed far above the bit, e.g., 30-40 feet (9.14-12.19 meters) above the bit. The long spacing between the electromagnetic sensors and the bit significantly degrades look-ahead sensitivity (the sensitivity of the electromagnetic logging measurements to formation properties ahead of the bit) and therefore the effectiveness of electromagnetic look-ahead measurements in geosteering operations.

In another known BHA configuration, an electromagnetic logging module is deployed between the bias unit including the steering pads and the control unit of a rotary steerable system. While such a configuration enables the electromagnetic sensors to be deployed closer to the bit (and may therefore enable higher quality electromagnetic look-ahead measurements), it requires the control unit (including the various navigational sensors and gamma ray logging sensors) to be moved further up the string. Increasing the distance between the control unit (and its navigational sensors) and the drill bit tends to significantly degrade the steering performance and controllability of the system. It will be appreciated that a need remains for a BHA configuration suitable for making electromagnetic look-ahead measurements while maintaining the steering performance and controllability of conventional configurations.

Figure 2A:
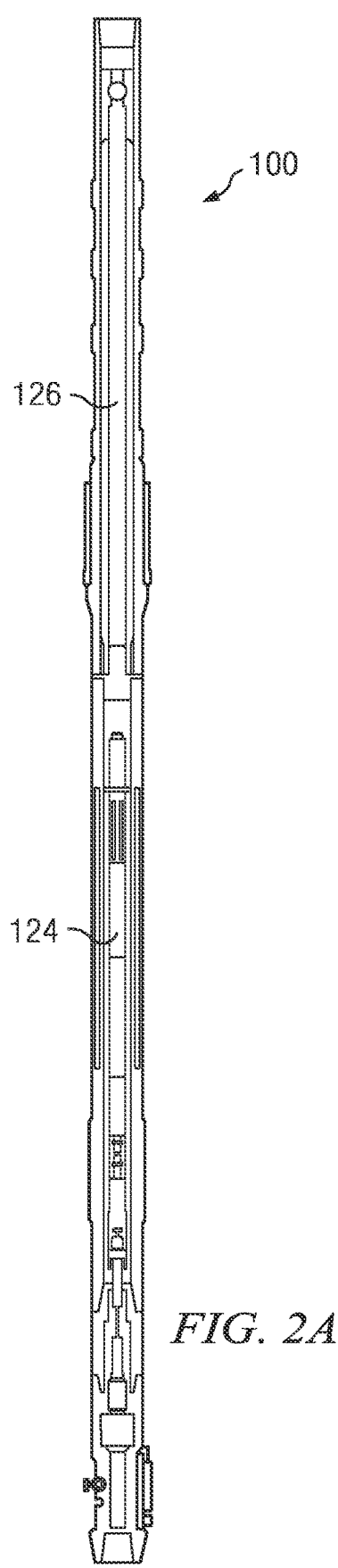
FIGS. 2A and 2B (collectively FIG. 2) depict cross sectional (2A) and side (2B) views of one example of the integrated drilling system shown on FIG. 1.
Figure 2B:
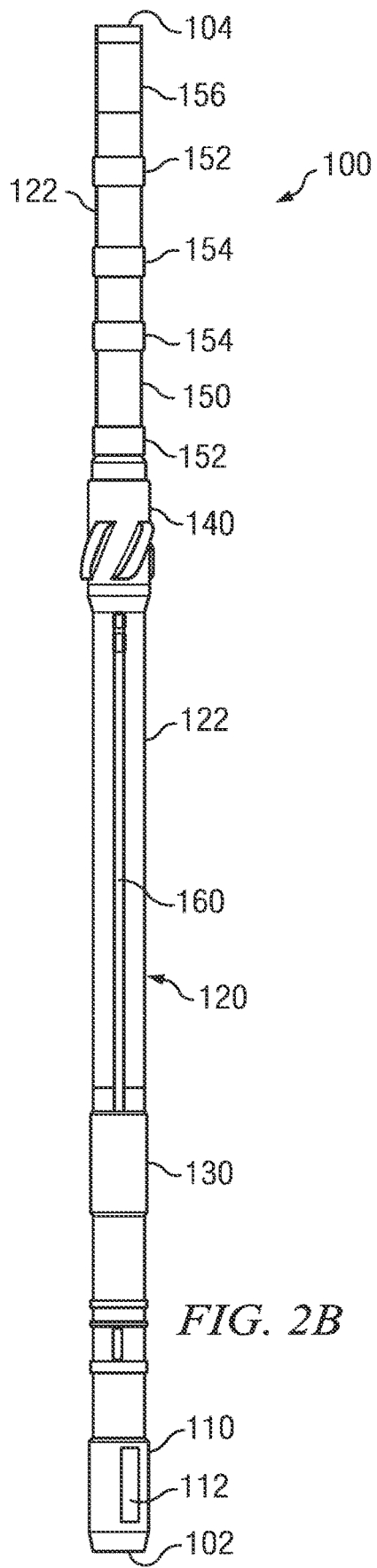

Turning to FIGS. 2A and 2B (collectively FIG. 2), one example embodiment of integrated system 100 is depicted in cross sectional (2A) and side (2B) views. In the depicted embodiment, system 100 includes a rotary steerable system bias unit 110 located at a downhole end 102 of the system 100 (e.g., immediately above the drill bit) and an integrated controller 120 located at an uphole end 104 of the system 100. The bias unit 110 may include a plurality of steering pads 112 configured to contact the wellbore and steer the direction of drilling (e.g., as described above with respect to the PowerDrive® rotary steerable systems). As depicted, the integrated controller 120 is located uphole of and is coupled to the bias unit 110 (e.g., via a crossover sub). The integrated controller 120 includes an outer collar 122 and first and second, lower and upper control units 124 and 126 deployed in the collar 122. The first control unit 124 is a rotary steerable control unit (e.g., deployed in a roll stabilized housing) and is deployed in a lower end of the collar 122. The rotary steerable control unit 124 may include electronics for controlling the rotary steerable bias unit including, for example, various processors and electronic memory, one or more navigational sensors such as accelerometers, magnetometers, and/or gyroscopic sensors, and one or more gamma ray sensors. The second control unit 126 is an electromagnetic LWD control unit and is deployed in an upper end of the collar 122. The electromagnetic LWD control unit 126 (also referred to as an electronics chassis) may include electronics for controlling electromagnetic transmitters and receivers (described in more detail below) including, for example, a power supply, one or more digital processors, and electronic memory.

An electromagnetic antenna 130 is deployed in a circumferential recess on a lower end of the collar 122 circumferentially about the rotary steerable control unit 122. Being deployed on a lower end of the collar and about the rotary steerable control unit, antenna 130 may be thought of (and referred to herein) as a "near bit" antenna. In the depicted embodiment, system 100 further includes a stabilizer 140 and an electromagnetic logging module 150 including a plurality of electromagnetic transceivers 152, 154 (electromagnetic transmitters and/or receivers) deployed about an upper end of the collar 122 (and about the electronics chassis 126).

With continued reference to FIG. 2, the collar 122 includes an electrical jumper 160 providing an electrical connection (or connections) between a power supply and control electronics located in the electronics chassis 126 and the electromagnetic antenna 130 deployed on a lower end of the collar 122 (and about the rotary steerable control unit 124). The electrical jumper 160 includes a plurality of electrical connectors (wires) deployed in a longitudinal groove (described in more detail below with respect to FIGS. 3-4) disposed in an external surface of the collar 122.

In certain embodiments, the electromagnetic antenna 130 may advantageously be an electromagnetic transmitting antenna (also referred to herein as a transmitter), for example, including an axial antenna, a transverse antenna, and/or a tilted antenna. The antenna 130 may further include a biaxial or triaxial antenna arrangement, for example, including collocated axial and transverse antennas. Those of ordinary skill will readily appreciate that a biaxial antenna arrangement commonly includes an axial antenna and a transverse antenna. A triaxial antenna arrangement commonly includes three collocated, mutually orthogonal antennas, for example, including an axial antenna and first and second transverse antennas or three mutually orthogonal tilted antennas. Those or ordinary skill in the art will readily appreciate that the antenna 130 further includes a shield deployed about the sensitive antenna components. Such shields are well known in the art.

It will be understood that an axial antenna is one whose magnetic moment is substantially parallel with the longitudinal axis of the collar 122 (by convention the z direction). A transverse antenna is one whose magnetic moment is substantially perpendicular to the longitudinal axis of the tool. A transverse antenna may include a saddle coil and generates a radiation pattern that is substantially equivalent to a dipole that is perpendicular to the axis of the collar 122 (by convention the x or y direction). A tilted antenna is one whose magnetic moment is neither parallel nor perpendicular with the axis of the tool. Such axial, transverse, and tilted antennas are well known. In certain advantageous embodiments, the antenna 130 includes at least a transverse transmitting antenna (a transverse transmitter), for example, a biaxial arrangement including collocated axial and transverse transmitting antennas.

With continued reference to FIG. 2, logging module 150 may include substantially any suitable electromagnetic transceivers (transmitters and/or receivers). In the depicted embodiment, the module 150 may include first and second axial transmitters 152 deployed about corresponding first and second axial receivers 154 (although the disclosed embodiments are in no way intended to be limited to such a configuration). The module 150 may further optionally include a deep receiving antenna 156, for example, deployed above transceivers 152, 154 as depicted. Receiving antenna 156 may include any combination of axial, transverse, and/or tilted receiving antennas (as described above with respect to antenna 130) and may be configured for making deep-reading and look-ahead measurements via electromagnetic coupling with transmitter 130. In one embodiment receiver antenna 156 includes a biaxial arrangement including collocated axial and transverse receiving antennas.

While not depicted in FIGS. 2, 3, and 4, it will be appreciated that electromagnetic antennas (transmitters and/or receivers) 130, 152, 154, and 156 may include protective shields deployed about the sensitive antenna components. Such shields are well known in the industry and may include various slot configurations to promote the transmission of desirable electromagnetic wave components (e.g., to attenuate undesirable components). The disclosed embodiments are not limited to antennas including shields or shields having any particular configuration.

It will be appreciated that in system 100 both the transmitting antennas 130 and the rotary steerable control unit 120 are deployed close to the bit (with the antennas 130 being deployed about the rotary steerable control unit 124. As such, system 100 may advantageously enable electromagnetic measurements with good look-ahead sensitivity and steering performance equivalent to commercially available PowerDrive™ rotary steerable systems. System 100 may therefore advantageously provide for improved geosteering and payzone steering operations.

With still further reference to FIG. 2, it will be appreciated that the integrated system 100 is not limited to the use of bias unit 110 including steering pads. The system 100 may make use of substantially any suitable steering mechanism, for example, including the internal steering mechanism utilized in the PowerDrive Xceed™ rotary steerable systems or the piston driven swivel (or U-joint) utilized in the PowerDrive Archer® rotary steerable systems.

Figure 3A:
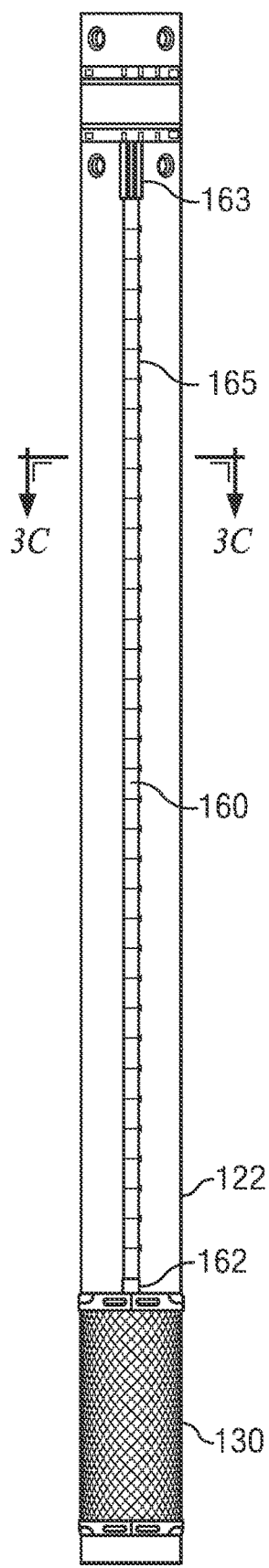
FIGS. 3A-3C (collectively FIG. 3) depict one embodiment of an electrical jumper portion of the integrated drilling system shown on FIG. 2.
Figure 3B:
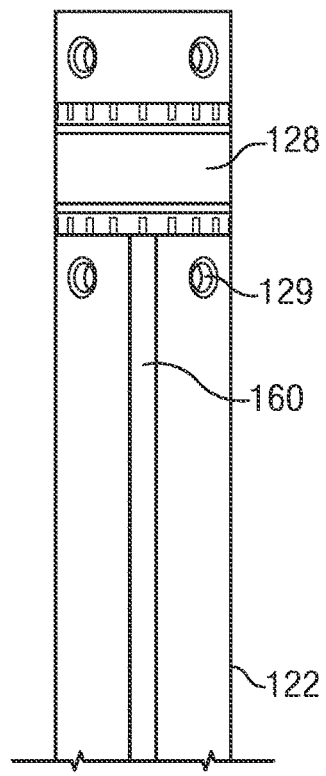
Figure 3C:
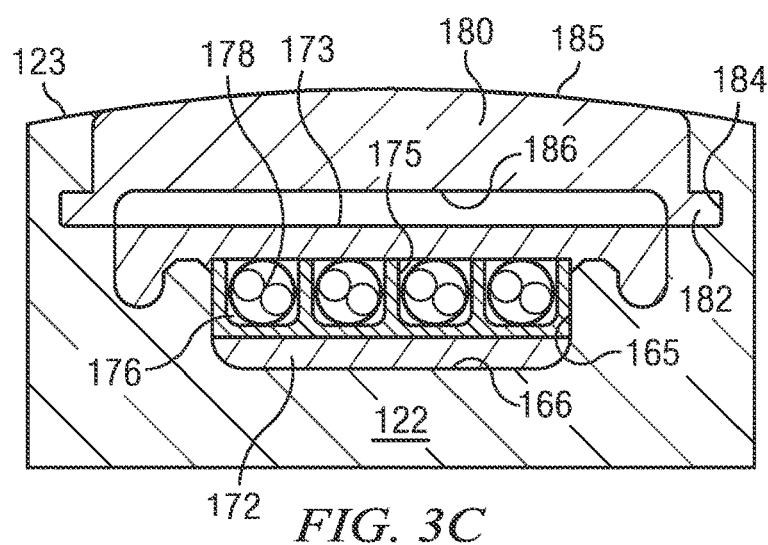

FIGS. 3A, 3B, and 3C (collectively FIG. 3) depict jumper 160 in further detail. FIG. 3A depicts a side view of collar 122 including the electrical jumper 160. As described above, the jumper 160 includes a plurality of electrical connectors deployed in a longitudinal groove 165 disposed in an outer surface of the collar 122. The jumper extends at least a portion of a length of the collar 122 from electromagnetic antenna 130 on a downhole end 162 thereof to an electronics chassis on an uphole end 163 thereof. In certain embodiments, the jumper may extend 8 feet (2.44 meters) or more, e.g., 10 feet (3.05 meters) or more or 12 feet (3.66 meters) or more, along the length of the collar 122 depending on the detailed configurations of the integrated system 100 and the integrated controller 120.

FIG. 3B depicts a side view of the uphole end 163 of the jumper. As depicted, the jumper 160 terminates into a shielded cylindrical recess 128 in the outer surface of the collar 122 at which location the electrical connectors are routed to feedthrough connectors (not shown). The feedthrough connectors provide electrical connection to the electronics chassis 126 deployed in the upper end of the collar 122. A plurality of ports 129 may provide access to the electrical conductors connecting the jumper 160 with the electronics chassis 126.

FIG. 3C depicts an axial cross section of jumper embodiment 160. As depicted, the jumper 160 is deployed in a longitudinal groove 165 in the surface of the collar 122. A layer of rubber 172 is disposed on a bottom surface 166 of the groove 165. An insulative wire tray 175 is deployed atop the rubber layer 172. The wire tray 175 includes a plurality of channels 176 sized and shaped for supporting electrical conductors (wires), for example, a twisted pair 178 of insulated wires. As depicted, the insulated wires are grouped into twisted pairs 178, one pair corresponding to each antenna in the transmitter 130. The use of a twisted pair 178 tends to reduce crosstalk from the jumper 160 to the receiver antenna (i.e., tends to reduce or prevent the jumper 160 from functioning as an electromagnetic transmitter and thereby electromagnetically coupling with the receiver). A second layer of rubber 173 (an overmold) is disposed over the wire tray 175 and the electrical conductors 178, thereby essentially encapsulating the wire tray 175 and the electrical conductors 178 in a protective rubber housing.

With continued reference to FIG. 3C, the jumper 160 may further include a protective cover 180 deployed over the wire tray 175 and corresponding electrical conductors 178. The cover 180 may be advantageously fabricated from a construction material similar to that of the collar 122 and may be configured to protect the jumper assembly, including the electrical conductors 178 and the rubber overmold 173, from mechanical impacts with the borehole. The cover 180 may be secured in place on the collar 122, for example, via conventional screws (not shown), a weld, and/or a compression fit in which flanges 182 engage corresponding slots 184 in the groove 165. The cover may be sized and shaped such that an outer surface 185 thereof is substantially flush with the outer cylindrical surface 123 of the collar 122. The inner surface 186 of the cover may or may not contact rubber layer 173, but generally is sized and shaped to form a snug fit with the upper rubber layer.

FIGS. 4A-4D (collectively FIG. 4) depict an alternative jumper 160' embodiment. Jumper 160' is similar to jumper 160 in that it provides one or more electrical connections between electronics chassis 126 and electromagnetic antenna 130. As depicted on FIGS. 4A and 4B, jumper 160' terminates at or near an upper end of the collar 122 at which the electrical connectors in the jumper 160' are connected to feedthrough connectors located within the jumper itself and which provide electrical connection to the electronics chassis 126. Jumper embodiment 160' may advantageously provide better structural integrity than jumper 160 in that it doesn't require a cylindrical recess in the outer surface of the collar 122 (as depicted on FIG. 3). Such a configuration may therefore be preferred in smaller diameter tool configurations.

Figure 4A:
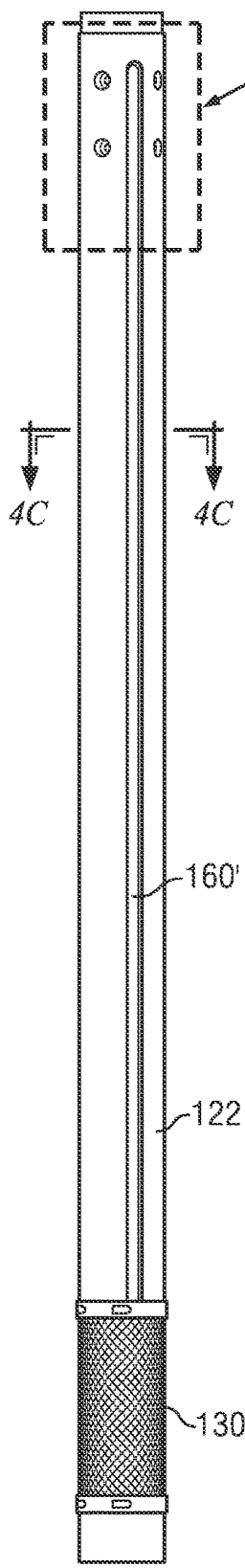
FIGS. 4A-4D (collectively FIG. 4) depict another embodiment of an electrical jumper portion of the integrated drilling system shown on FIG. 2.
Figure 4B:
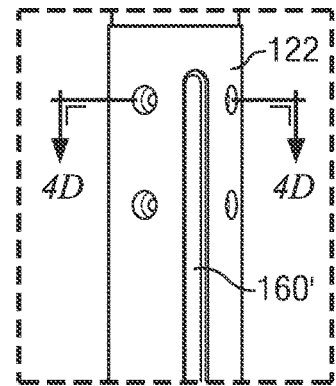
Figure 4C:
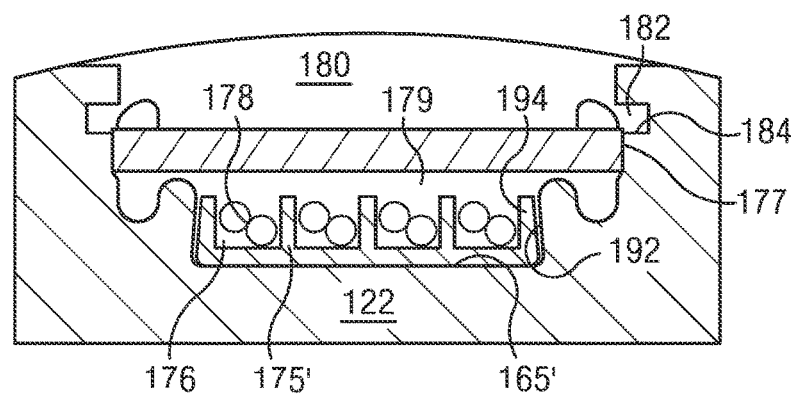

FIG. 4C depicts an axial cross section of jumper embodiment 160'. As depicted, the jumper 160' is deployed in a longitudinal groove 165' in the surface of the collar 122. An insulative wire tray 175' is deployed on a bottom surface of the groove 165'. As described above with respect to FIG. 3C, the wire tray 175' includes a plurality of channels 176 sized and shaped for housing a twisted pair 178 of electrical conductors (wires). The wire tray 175' and electrical conductors 178 may be encapsulated in a non-conductive material 179 such as an epoxy-glass composite or other epoxy-resin based material. The use of an epoxy compound may be advantageous in that the wire tray 175' and electrical conductors may be encapsulated without the high molding stresses inherent in rubber molding operations. The jumper 165' may optionally further included a sealing rubber layer 177 deployed atop the encapsulated wire tray 175' as depicted. A protective cover 180, such as described above with respect to FIG. 3C, may be deployed over the rubber layer 177.

With continued reference to FIG. 4C, the jumper groove 165' may be shaped to include angled (or tapered) lower sidewalls 192 as depicted. The wire tray 175' may have or be flexed to include a corresponding tapered shape as also depicted at 194. Such a "dovetail" configuration may enable the wire tray 175' (and the corresponding electrical conductors 178) to remain anchored in the groove during routine temperature cycling, bending, and other loading during use of the integrated drilling system 100 in a borehole environment.

Figure 4D:
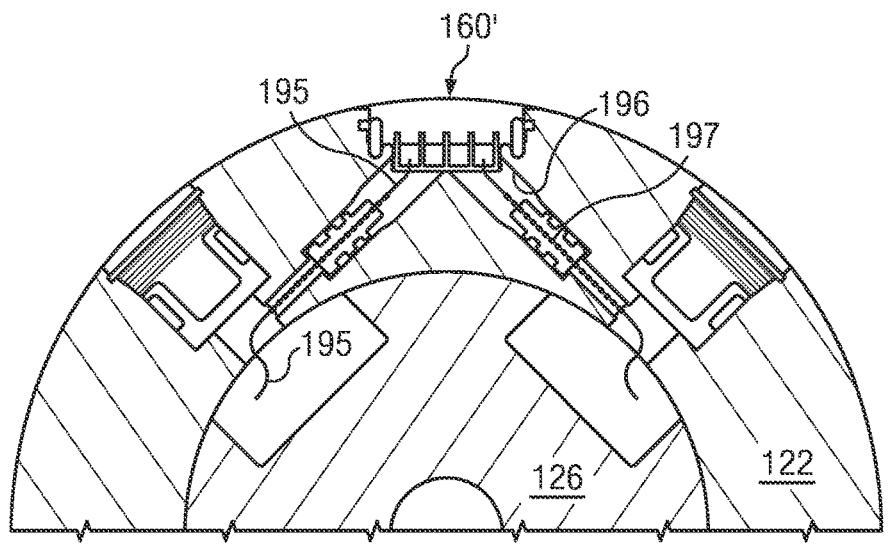

FIG. 4D depicts an axial cross-sectional view through the first and second feedthrough connectors (as indicated on FIG. 4B). As depicted, feedthrough connectors 195 provide electrical connection(s) between the electrical connectors 178 in the wire tray 175' (FIG. 4C) and the electronics chassis 126 (it will be understood that the connectors 195 are depicted schematically). The feedthrough connectors 195 are routed through corresponding ports 196 and supported by housings 197 that are deployed in and sealingly engage the ports 196. As noted above, such a configuration obviates the need for a cylindrical recess in the collar, thereby eliminating a weak point in the collar 122. The system may include as many ports and feedthrough connectors as required to make electrical connection between the plurality of twisted pairs 178 and the electronics chassis 126 required to support antennas 130.

As noted above system 100 may advantageously enable electromagnetic measurements with good look-ahead sensitivity and steering performance and may therefore advantageously provide for improved geosteering and payzone steering operations. During such operations the direction of drilling is determined in response to measured logging measurements (e.g., directional resistivity measurements), for example, to maintain the wellbore within a pay zone (e.g., a known oil or gas bearing layer). The direction of drilling may be determined, for example, with respect to a formation boundary or other feature and is often intended to keep the wellbore in a particular section or region of the reservoir to maximize economic production. Various geosteering methodologies are known in the industry and are disclosed, for example, in commonly assigned U.S. Pat. Nos. 7,093,672; 8,736,276; and 9,273,517.

It will be understood that the disclosure includes numerous embodiments. These embodiments include, but are not limited to, the following embodiments.

In a first embodiment, an integrated drilling system comprises a rotary steerable control unit and an electromagnetic logging while drilling (LWD) control unit deployed in a collar, the rotary steerable control unit deployed below the electromagnetic LWD control unit in the collar, the rotary steerable control unit configured to control a direction of drilling of the integrated drilling system; a near bit electromagnetic antenna deployed in a recess in the collar circumferentially about the rotary steerable control unit; at least one electromagnetic transmitter and at least one electromagnetic receiver deployed in corresponding recesses in the collar circumferentially about the electromagnetic LWD control unit, the at least one transmitter and at least one receiver configured to make electromagnetic logging measurements while drilling; and an electrical jumper providing an electrical connection between the near bit electromagnetic antenna and the electromagnetic LWD control unit.

A second embodiment may include the first embodiment, further comprising a rotary steerable bias unit including a plurality of extendable and retractable steering pads configured to engage a wellbore wall and steer a direction of drilling, the rotary steerable bias unit deployed below the collar.

A third embodiment may include any one of the first through second embodiments, wherein the rotary steerable control unit is deployed in a roll stabilized housing and further includes at least one navigation sensor and at least one gamma ray sensor.

A fourth embodiment may include any one of the first through third embodiments, wherein the near bit electromagnetic antenna comprises a transverse transmitting antenna.

A fifth embodiment may include the fourth embodiment, wherein the near bit electromagnetic transmitter further comprises a collocated axial transmitting antenna.

A sixth embodiment may include any one of the first through fifth embodiments, wherein the electrical jumper comprises a plurality of insulated electrical conductors deployed in a groove in an outer surface of the collar.

A seventh embodiment may include the sixth embodiment, wherein the jumper further comprises a wire tray deployed in the groove, the wire tray including a plurality of channels sized and shaped for supporting the electrical conductors.

An eighth embodiment may include the seventh embodiment, wherein the electrical conductors are grouped into twisted pairs, each of the twisted pairs deployed in a corresponding channel in the wire tray and corresponding to an antenna in the near bit electromagnetic antenna.

A ninth embodiment may include any one of the seventh through eighth embodiments, wherein the jumper further comprises at least one rubber layer deployed over the wire tray; and a cover deployed over the rubber layer, the cover being coupled to the collar.

A tenth embodiment may include any one of the seventh through ninth embodiments, further comprising a plurality of feedthrough connectors that electrically connect the electrical conductors in the jumper with the electromagnetic LWD control unit, wherein the feedthrough connectors are routed through corresponding ports in the collar and are supported by housings that are deployed in and sealingly engage the ports.

In an eleventh embodiment, a method for geosteering comprises: drilling a subterranean wellbore using an integrated drilling system, the integrated drilling system including a rotary steerable control unit and an electromagnetic logging while drilling (LWD) control unit deployed in a collar, the rotary steerable control unit deployed below the electromagnetic LWD control unit in the collar, the rotary steerable control unit configured to control a direction of drilling of the integrated drilling system; a near bit electromagnetic antenna deployed in a recess in the collar circumferentially about the rotary steerable control unit; at least one electromagnetic transmitter and at least one electromagnetic receiver deployed in corresponding recesses in the collar circumferentially about the electromagnetic LWD control unit, the at least one transmitter and at least one receiver configured to make electromagnetic logging measurements while drilling; and an electrical jumper providing an electrical connection between the near bit electromagnetic antenna and the electromagnetic LWD control unit; causing the near bit electromagnetic antenna and the at least one electromagnetic transmitter and at least one electromagnetic receiver to make electromagnetic logging measurements while drilling; processing the electromagnetic measurements to determine a direction of drilling for the drilling the subterranean wellbore; and steering the drilling the subterranean wellbore along the direction of drilling.

A twelfth embodiment may include the eleventh embodiment, wherein the electromagnetic LWD control unit is configured to cause the near bit electromagnetic antenna and the at least one electromagnetic transmitter and at least one electromagnetic receiver to make the electromagnetic logging measurements while drilling.

A thirteenth embodiment may include any one of the eleventh through twelfth embodiments, wherein the rotary steerable control unit is configured to process the electromagnetic measurements to determine the direction of drilling.

A fourteenth embodiment may include any one of the eleventh through thirteenth embodiments, wherein the near bit electromagnetic antenna comprises a transverse transmitting antenna.

A fifteenth embodiment may include any one of the eleventh through fourteenth embodiments, wherein the electrical jumper further comprises a plurality of insulated electrical conductors deployed in a groove in an outer surface of the collar; and a wire tray deployed in the groove, the wire tray including a plurality of channels sized and shaped for supporting the electrical conductors, the electrical conductors grouped into twisted pairs, each of the twisted pairs deployed in a corresponding channel in the wire tray and corresponding to an antenna in the near bit electromagnetic antenna.

In a sixteenth embodiment, an integrated drilling system comprises a rotary steerable control unit and an electromagnetic logging while drilling (LWD) control unit deployed in a collar, the rotary steerable control unit deployed below the electromagnetic LWD control unit in the collar, the rotary steerable control unit configured to control a direction of drilling of the integrated drilling system; at least one near bit electromagnetic transmitting antenna deployed in a recess in the collar circumferentially about the rotary steerable control unit; at least one electromagnetic receiving antenna deployed in a recess in the collar circumferentially about the electromagnetic LWD control unit, the at least one near bit electromagnetic transmitting antenna and the at least one electromagnetic receiving antenna configured to make electromagnetic logging measurements while drilling; and an electrical jumper providing an electrical connection between the at least one near bit electromagnetic antenna and the electromagnetic LWD control unit.

A seventeenth embodiment may include the sixteenth embodiment, wherein the electrical jumper comprises a plurality of insulated electrical conductors deployed in a groove in an outer surface of the collar.

An eighteenth embodiment may include the seventeenth embodiment, wherein the jumper further comprises a wire tray deployed in the groove, the wire tray including a plurality of channels sized and shaped for supporting the electrical conductors, the electrical conductors grouped into twisted pairs, each of the twisted pairs deployed in a corresponding channel in the wire tray and corresponding to an antenna in the at least one near bit electromagnetic transmitting antenna.

A nineteenth embodiment may include any one of the seventeenth through eighteenth embodiments, further comprising a plurality of feedthrough connectors that electrically connect the electrical conductors in the jumper with the electromagnetic LWD control unit, wherein the feedthrough connectors are routed through corresponding ports in the collar and are supported by housings that are deployed in and sealingly engage the ports.

A twentieth embodiment may include any one of the sixteenth through nineteenth embodiments, wherein the at least one electromagnetic transmitting antenna comprises a transverse transmitting antenna and an axial transmitting antenna; and the at least one electromagnetic receiving antenna comprises a transverse receiving antenna and an axial receiving antenna.

Although an integrated drilling system has been described in detail, it should be understood that various changes, substitutions and alternations can be made herein without departing from the spirit and scope of the disclosure as defined by the appended claims.

The invention claimed is:

1. An integrated drilling system comprising:
a rotary steerable control unit and an electromagnetic logging while drilling (LWD) control unit deployed in a collar, the rotary steerable control unit deployed below the electromagnetic LWD control unit in the collar, the rotary steerable control unit configured to control a direction of drilling of the integrated drilling system;
a near bit electromagnetic antenna deployed in a recess in the collar circumferentially about the rotary steerable control unit;
at least one electromagnetic transmitter and at least one electromagnetic receiver deployed in corresponding recesses in the collar circumferentially about the electromagnetic LWD control unit, the at least one transmitter and the at least one receiver configured to make electromagnetic logging measurements while drilling; and
an electrical jumper providing an electrical connection between the near bit electromagnetic antenna and the electromagnetic LWD control unit, wherein the electrical jumper comprises a plurality of insulated electrical conductors deployed in a groove in an outer surface of the collar.

2. The system of claim 1, further comprising a rotary steerable bias unit deployed below the collar, the rotary steerable bias unit including a plurality of extendable and retractable steering pads configured to engage a wellbore wall and steer a direction of drilling.

3. The system of claim 1, wherein the rotary steerable control unit is deployed in a roll stabilized housing and further includes at least one navigation sensor and at least one gamma ray sensor.

4. The system of claim 1, wherein the near bit electromagnetic antenna comprises a transverse transmitting antenna.

5. The system of claim 4, wherein the near bit electromagnetic transmitter further comprises a collocated axial transmitting antenna.

6. The system of claim 1, wherein the jumper further comprises a wire tray deployed in the groove, the wire tray including a plurality of channels sized and shaped for supporting the electrical conductors.

7. The system of claim 6, wherein the electrical conductors are grouped into twisted pairs, each of the twisted pairs deployed in a corresponding channel in the wire tray and corresponding to an antenna in the near bit electromagnetic antenna.

8. The system of claim 6, wherein the jumper further comprises:
at least one rubber layer deployed over the wire tray; and
a cover deployed over the rubber layer and coupled to the collar.

9. The system of claim 6, further comprising a plurality of feedthrough connectors that electrically connect the electrical conductors in the jumper with the electromagnetic LWD control unit, wherein the feedthrough connectors are routed through corresponding ports in the collar and are supported by housings that are deployed in and sealingly engage the ports.

10. A method for geosteering, the method comprising:
drilling a subterranean wellbore using an integrated drilling system, the integrated drilling system including:
a rotary steerable control unit and an electromagnetic logging while drilling (LWD) control unit deployed in a collar, the rotary steerable control unit deployed below the electromagnetic LWD control unit in the collar, and the rotary steerable control unit configured to control a direction of drilling of the integrated drilling system;
a near bit electromagnetic antenna deployed in a recess in the collar circumferentially about the rotary steerable control unit;
at least one electromagnetic transmitter and at least one electromagnetic receiver deployed in corresponding recesses in the collar circumferentially about the electromagnetic LWD control unit, the at least one transmitter and the at least one receiver configured to make electromagnetic logging measurements while drilling; and
an electrical jumper providing an electrical connection between the near bit electromagnetic antenna and the electromagnetic LWD control unit, wherein the electrical jumper further comprises:
a plurality of insulated electrical conductors deployed in a groove in an outer surface of the collar; and
a wire tray deployed in the groove, the wire tray including a plurality of channels sized and shaped for supporting the electrical conductors, the electrical conductors grouped into twisted pairs, each of the twisted pairs deployed in a corresponding channel in the wire tray and corresponding to an antenna in the near bit electromagnetic antenna;
causing the near bit electromagnetic antenna and the at least one electromagnetic transmitter and the at least one electromagnetic receiver to make electromagnetic logging measurements while drilling;
processing the electromagnetic measurements to determine a direction of drilling for the drilling the subterranean wellbore; and
steering the drilling the subterranean wellbore along the direction of drilling.

11. The method of claim 10, wherein the electromagnetic LWD control unit is configured to cause the near bit electromagnetic antenna and the at least one electromagnetic transmitter and the at least one electromagnetic receiver to make the electromagnetic logging measurements while drilling.

12. The method of claim 10, wherein the rotary steerable control unit is configured to process the electromagnetic measurements to determine the direction of drilling.

13. The method of claim 10, wherein the near bit electromagnetic antenna comprises a transverse transmitting antenna.

14. An integrated drilling system comprising:
a rotary steerable control unit and an electromagnetic logging while drilling (LWD) control unit deployed in a collar, the rotary steerable control unit deployed below the electromagnetic LWD control unit in the collar, and the rotary steerable control unit configured to control a direction of drilling of the integrated drilling system;
at least one near bit electromagnetic transmitting antenna deployed in a recess in the collar circumferentially about the rotary steerable control unit;
at least one electromagnetic receiving antenna deployed in a recess in the collar circumferentially about the electromagnetic LWD control unit, the at least one near bit electromagnetic transmitting antenna and the at least one electromagnetic receiving antenna configured to make electromagnetic logging measurements while drilling; and an electrical jumper providing an electrical connection between the at least one near bit electromagnetic antenna and the electromagnetic LWD control unit, wherein the electrical jumper comprises a plurality of insulated electrical conductors deployed in a groove in an outer surface of the collar.

15. The system of claim 14, wherein the jumper further comprises a wire tray deployed in the groove, the wire tray including a plurality of channels sized and shaped for supporting the electrical conductors, the electrical conductors grouped into twisted pairs, each of the twisted pairs deployed in a corresponding channel in the wire tray and corresponding to an antenna in the at least one near bit electromagnetic transmitting antenna.

16. The system of claim 14, further comprising a plurality of feedthrough connectors that electrically connect the electrical conductors in the jumper with the electromagnetic LWD control unit, wherein the feedthrough connectors are routed through corresponding ports in the collar and are supported by housings that are deployed in and sealingly engage the ports.

17. The system of claim 14, wherein:
the at least one electromagnetic transmitting antenna comprises a transverse transmitting antenna and an axial transmitting antenna; and
the at least one electromagnetic receiving antenna comprises a transverse receiving antenna and an axial receiving antenna.

\* \* \* \* \*